March 30, 1926.

E. K. H. LUNDBERG

ACTUATING DEVICE FOR FLUID CONTROLLERS

Filed March 18, 1924

1,578,743

Inventor
E. K. H. Lundberg
By Marks & Clerk attys.

Patented Mar. 30, 1926.

1,578,743

UNITED STATES PATENT OFFICE.

ELOF KARL HJALMAR LUNDBERG, OF STOCKHOLM, SWEDEN.

ACTUATING DEVICE FOR FLUID CONTROLLERS.

Application filed March 18, 1924. Serial No. 700,148.

*To all whom it may concern:*

Be it known that I, ELOF KARL HJALMAR LUNDBERG, a subject of the King of Sweden, residing at Birkagatan 12, Stockholm, in the Kingdom of Sweden, have invented certain new and useful Improvements in Actuating Devices for Fluid Controllers, for which I have made application for patents in Sweden May 18, 1922, and of which the following is a specification.

This invention relates to a starting device for valves or the like of the type which are adapted when opened, to deliver a predetermined quantity of liquid. For the shifting of the valve a rotatable member (starting member) is used, provided for instance with one or more corners or projections, which, when the member is rotated, actuate the valve directly or indirectly. A member (holding member) is connected with the said starting member, which holding member is acted upon by a spring device or the like and the shape of which corresponds to the shape of the starting member, the position of the holding member relatively to the starting member being such, that when the latter has been rotated, for instance manually, to such a position, that it is about to shift the valve, the holding member, has reached a dead center, whereby the spring device will be able to rotate automatically the holding member and the starting member through such a further distance, that the starting member opens the valve and then permits the same to be closed. Owing to this arrangement the valve may not be held in open position by hand.

In the accompanying drawing a form of the invention is shown by way of example and applied to a starting device adapted to an automatically operating valve provided with an auxiliary valve, the said valve being so constructed that after the auxiliary valve has been actuated from the outside the main valve is opened and is then automatically closed, after a predetermined quantity of liquid has been let through.

Figure 1:
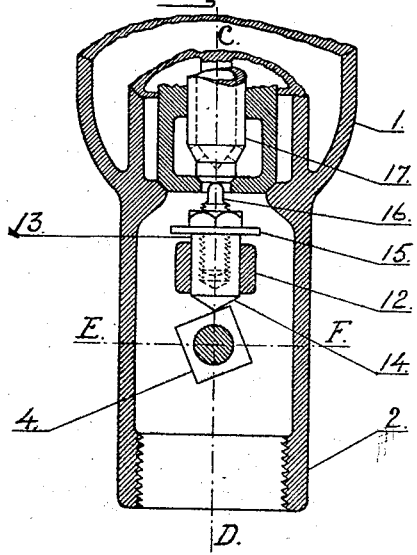
Figure 1 is a section along the line A—B in Figure 2.
Figure 2:
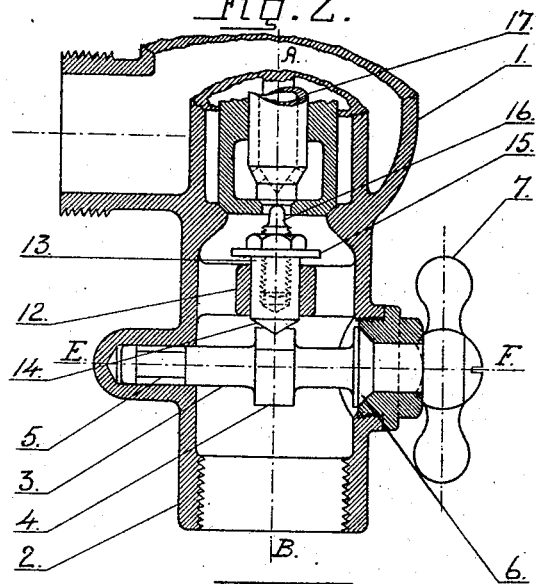
Figure 2 is a section along the line C—D in Figure 1.
Figure 3:
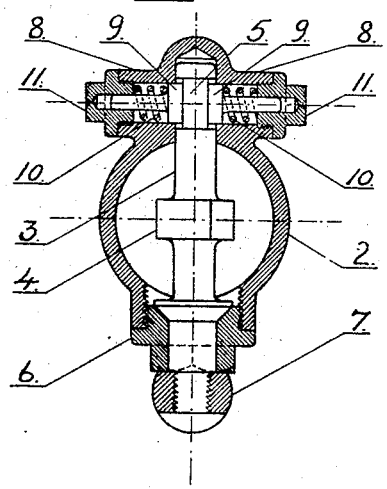
Figure 3 is a section along the line E—F in Figure 1.
Figure 4:
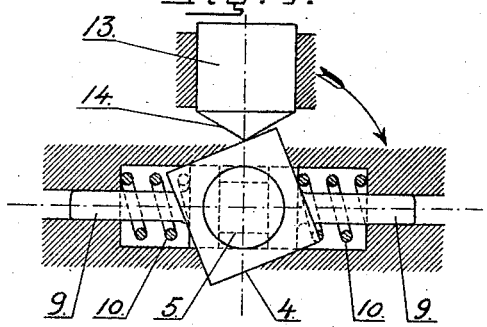
Figures 4 and 5 illustrate diagrammatically the principal parts of the starting device in two different positions of equilibrium.
Figure 5:
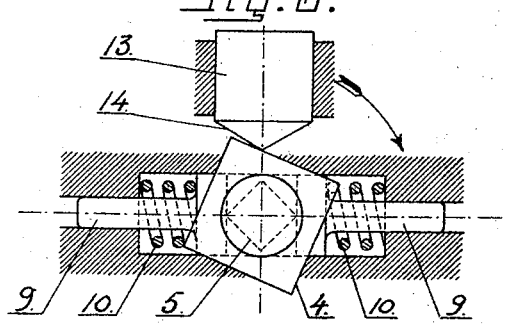

The valve box 1 is provided with an outlet pipe 2 in the walls of which a transverse shaft 3 (starting shaft) is journalled. By the starting shaft 3 a square member 4 (starting member) located in the centre line of the outlet pipe is connected with a square member 5 (holding member) located at one of the journals of the shaft 3. The lateral surfaces of one of the said square members form an angle of 22.5° with the lateral surfaces respectively of the other member as shown in Figures 4 and 5. The starting spindle 3 is provided with a tightening cone 6 and outside the outlet pipe 2 a handle 7 is fixed to the spindle. In the journal at the end of the spindle 3 on which the holding member 5 is provided, the outlet pipe 2 is provided with hollow nipples 8 (Figure 3), in which pistons 9, actuated by springs 10, are movable. The said nipples are closed by screw-threaded plugs 11, by means of which the tension of the springs 10 is adjusted and the pistons 9 are guided. In a guide 12 provided in the outlet pipe above the starting member 4 is slidable a spindle 13 (starting spindle), the lower end 14 of which always bears against one of the sides of the starting member 4. On the top end of the starting spindle 13 a disc 15 is provided and a screw-threaded pin 16 is adjustable in the same. The effective length of the said pin is so adjusted that while the valve is closed and the lower end 14 of the starting spindle bears against one of the sides of the starting member 4, the free end of the pin 16 is located immediately below the auxiliary valve 17, which for the opening of the valve should be actuated by the starting device the said auxiliary valve constituting in the present case a counter member.

The starting shaft 3 together with the starting member 4 and the holding member 5 is able to occupy only two positions of equilibrium counted from each starting position, viz, the starting position, shown in Figure 4 and a second position of equilibrium shown in Figure 5. In the starting position the pistons 9 actuated by the springs 10 gear against two opposite sides of the holding member 5. In the second position of equilibrium, Figure 5, the said pressure is sustained by two opposite corners of the holding member 5 and the state of equilibrium takes place as the said two corners are located in a plane perpendicular to the end surfaces of the pistons 9. At all other positions of the starting shaft a moment of torsion on the starting shaft 3 is created by the spring pressure against the corners of the holding member 5, which turns the shaft 3 into the next starting position (corresponding to Figure 4).

The starting device acts in the following way:—The shaft 3 is rotated at starting by means of the handle 7 in the direction indicated by the arrows, Figures 4 and 5. The starting spindle 13 slides during the turning on the starting member 4. Owing to the oblique position of the sides of the starting member 4 with relation to the sides of the holding member 5 the starting spindle 13 will not be forced upwards during the turning of the starting member 4 from the starting position, Figure 4, to the second position of equilibrium, Figure 5. If the angle of inclination is 22.5°, the starting spindle 13 will be located at just the same level in both the different positions of equilibrium shown in Figures 4 and 5. As the turning of the starting shaft in the direction indicated by the arrows is continued, the starting spindle 13, sliding on the starting member 4, is forced upwards as the corner of the said member 4 crosses the centre line of the starting spindle 13. The tension of the springs 10 is so adapted that the moment of torsion of the springs with regard to the starting shaft, after the latter has passed its second position of equilibrium, Figure 5, is able to turn the starting shaft and the starting member into a new starting position corresponding to the previous starting position shown in Figure 4, even if the turning of the handle 7 has been interrupted, after the starting shaft has passed its second position of equilibrium, Figure 5. As the starting spindle 13 is raised during the last part of the turning operation, the adjustable pin 16, screwed into the starting spindle, actuates the auxiliary valve 17 so that it is lifted and the main valve is opened, The pressure of the liquid flowing through the valve against the disc 15 aids in keeping the starting spindle 13 pressed against the starting member 4 during the last part of the turning operation, so that as the valve is being closed the auxiliary valve 17 does not impinge against the pin 16.

The cone 6 prevents leakage. Counted from each starting position, the starting device has only two positions of equilibrium, but in no one of these positions actuates the pin 16 or the auxiliary valve 17, in consequence whereof the main valve is closed at both the positions of equilibrum. Consequently the starting device cannot be so positioned that the main valve remains open or leaks. Owing to the fact that the lifting of the starting spindle 13 takes place during the last period of the rotation and owing to the moment of torsion exerted by the spring actuated pistons 9 on the locking member 5 of the starting shaft, the starting takes place nearly instantaneously and always during the same period, which is of importance for the starting of valves which should deliver automatically a certain quantity of liquid for each starting.

Starting devices arranged in accordance with this invention may evidently be carried out in many other ways than that stated above by way of example. In any case the starting member 4 is provided with one or more corners or parts projecting from its centre, which during the turning of the starting member successively actuate the starting spindle while the holding member 5 connected with the starting member is so arranged that it, in consequence of the pressure exerted on the member, causes the starting member 4 after it has been so turned that one of its corners or projections has actuated the starting spindle to occupy a position of equilibrium in which the starting spindle is not actuated by a corner or projection of the starting member. The holding member and the starting member ought to be so arranged with relation to each other that the starting member when turned for actuating the starting spindle is not able to occupy other positions of equilibrium than those in which the starting spindle is not acted upon by a corner or projection of the starting member. The shape of the holding member must, however, be analogous to the shape of the starting member. Also the spring pressure may evidently be effected by other means than those shown in the drawing. The starting spindle may be dispensed with, in which case the starting member may actuate directly the auxiliary valve.

The invention may evidently be applied to other cases than that indicated.

I claim:

1. In a starting device for valves or the like adapted to deliver predetermined quantities of liquid the combination with a rotatable starting effecting member, provided with projections for the shifting of the valve, of a holding member connected with the said starting member and corresponding in shape thereto, and yieldable means acting upon the said holding member, the position of the holding member with relation to the starting member being such, that, after the starting member has been rotated through such a distance that is about to open the valve, the holding member causes the starting member to automatically move through such a further distance, that it opens the valve and permits the same to be closed.

2. A starting device according to claim 1, characterized by the fact that the starting member consists of an equilateral body, and that the shape of the holding member corresponds to the shape of the starting member and the holding member is actuated upon on one or more of its sides by the yieldable means.

3. A starting device according to claim 1, wherein the lateral surfaces on the starting member and on the holding member which actuate the counter member respectively are acted upon by the yieldable means and have such an oblique position in relation to each other, that in such positions of equilibrium as may occur, viz. when pressure against the holding member is sustained by one or more of its lateral surfaces or by one or more of its corners, the starting member does not actuate the valve.

4. A starting device according to claim 1, characterized by the fact that connection between the starting member and the valve consists of a suitably guided spindle, and a screw threaded pin in engagement with the spindle for adjusting the effective length thereof.

In testimony whereof I have hereunto affixed my signature.

ELOF KARL HJALMAR LUNDBERG.